(12) United States Patent
Czymontek (10) Patent No.: US 12,174,860 B2
(45) Date of Patent: Dec. 24, 2024

(54) PROVIDING A RESILIENT APPLICATION PROGRAMMING INTERFACE FOR GEOGRAPHIC SERVICES

(71) Applicant: GOOGLE LLC, Mountain View, CA (US)

(72) Inventor: Herbert Czymontek, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/256,621

(22) PCT Filed: Dec. 20, 2019

(86) PCT No.: PCT/US2019/067924
§ 371 (c)(1),
(2) Date: Dec. 28, 2020

(87) PCT Pub. No.: WO2021/126251
PCT Pub. Date: Jun. 24, 2021

(65) Prior Publication Data
US 2022/0318279 A1    Oct. 6, 2022

(51) Int. Cl.
*G06F 16/00*      (2019.01)
*G06F 16/2455*    (2019.01)
*G06F 16/29*      (2019.01)

(52) U.S. Cl.
CPC ........ *G06F 16/29* (2019.01); *G06F 16/24561* (2019.01)

(58) Field of Classification Search
CPC .............. G06F 16/29; G06F 16/24561; G06F 16/24539
See application file for complete search history.

(56) References Cited

U.S. PATENT DOCUMENTS

2006/0190285 A1* 8/2006 Harris ................ G06Q 30/02
                                                  705/1.1
2018/0077030 A1* 3/2018 Lauer ................... H04L 43/16
(Continued)

FOREIGN PATENT DOCUMENTS

EP    3 070 621 A1    9/2016

OTHER PUBLICATIONS

International Search Report and Written Opinion for Application No. PCT/US2019/067924, dated Aug. 10, 2020.
(Continued)

*Primary Examiner* — Dinku W Gebresenbet
(74) *Attorney, Agent, or Firm* — MARSHALL, GERSTEIN & BORUN LLP (57) ABSTRACT

A method for providing availability of geographic data to enterprise clients. The method is implemented by processing hardware and includes generating a storage storing geographic information available to an enterprise client via an API call, where the enterprise client configured to (i) receive service requests from user devices and (ii) invoke the API to provide, in response to the service requests, information related to geography. When the enterprise client invokes the API to submit a query (304), the method includes: in a first instance, transmitting the query to a geographic service via a communication network (306) and generating a network-based response to the query using geographic information received from the geographic service in response to the query (312), and in a second instance, generating a storage-based response to the query using the geographic information stored in the storage (322).

18 Claims, 5 Drawing Sheets

(56) References Cited

U.S. PATENT DOCUMENTS

| | | | |
|---|---|---|---|
| 2018/0129681 A1 | 5/2018 | Jeter et al. | |
| 2018/0212904 A1* | 7/2018 | Smullen | H04L 51/04 |
| 2019/0005055 A1* | 1/2019 | Andrew | G06F 16/9535 |
| 2019/0188610 A1 | 6/2019 | Ogden et al. | |
| 2020/0034655 A1* | 1/2020 | Gupta | G06N 20/20 |

OTHER PUBLICATIONS

Davis et al., "OGC Web Map Service Implementation Challenges for Mobile Computers," Geoinformation (2009).

ArcGIS, "Add Layers to a Mapp (Offline)," (2020). Retreived from the Internet at: <URL:<https://developers.arcgis.com/labs/android/add-layers-to-a-map-offline/>.

"Take web maps offline", retrieved on Jul. 24, 2024 @https://web.archive.org/web/20191024135957/https://doc.arcgis.com/en/arcgis-online/manage-data/take-maps-offline.htm.

* cited by examiner

PROVIDING A RESILIENT APPLICATION PROGRAMMING INTERFACE FOR GEOGRAPHIC SERVICES

FIELD OF THE DISCLOSURE

The present disclosure relates to geographic services and, more particularly, to providing a resilient application programming interface (API) to an enterprise client.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Today, numerous electronic devices such as personal computers, tablets, mobile phones, special-purpose navigators, etc. provide digital maps of geographic areas and step-by-step directions for navigating between geographic locations. The digital maps and/or navigation directions can be provided via special-purpose software applications such as mapping and navigation applications as well as via general-purpose software applications such as web browsers.

In addition to dedicated geographic applications, some providers of geographic services expose application programming interfaces (APIs) for accessing geographic services from various software applications or web pages, for example. Moreover, some providers expose both "regular" APIs for accessing by individual applications or devices and enterprise geographic API for access by other services. For example, an enterprise client can be a provider of a certain service to multiple users. The enterprise client can receive requests for the service and, as a part of servicing these requests, require certain geographic information. The enterprise client accordingly can invoke the enterprise geographic API to obtain the geographic information. The enterprise geographic API typically sends a request for the geographic information over a communication network.

SUMMARY

An example embodiment of the techniques of this disclosure is a method for providing availability of geographic data to enterprise clients. The method is implemented by processing hardware and includes generating a storage storing geographic information available to an enterprise client via an API call, where the enterprise client is configured to (i) receive service requests from user devices and (ii) invoke the API to provide, in response to the service requests, information related to geography. When the enterprise client invokes the API to submit a query, the method includes: in a first instance, transmitting the query to a geographic service via a communication network and generating a network-based response to the query using geographic information received from the geographic service in response to the query, and in a second instance, generating a storage-based response to the query using the geographic information stored in the storage.

In various implementations, the method above includes one or more of the following features. The geographic service is determined to be available in the first instance, and the geographic service is determined to be unavailable in the second instance. In the second instance: transmitting the query to the geographic service and generating the storage-based response upon determining that no response to the query is received within a predetermined period of time that begins when the query is transmitted to the geographic service. In the second instance: generating the storage-based response to the query using the geographic information stored in the cache and, in response to determining that the network-based response and the storage-based response differ by more than a threshold amount, updating latency statistics periodically reported to the geographic service. Providing an alert to the enterprise client. The network-based response and the storage-based response include respective estimates of a time for traveling between a source and a destination. In the second instance, providing an indication that the query was serviced using the storage along with the storage-based response to the query. Generating the storage includes generating the storage on one or more network servers associated with the enterprise client. Generating the storage includes generating the storage on one or more network servers associated with the enterprise client. Providing, in the storage, a set of instructions configured to implement a function for generating navigation directions using the geographic information stored in the storage. The function for generating the navigation directions generates a navigation route using pre-computed route segments. Providing, in the storage, a set of instructions configured to implement a function for executing a local search for a specified geographic region. Adding geographic information to the storage based on a prior call of the API by the enterprise client. The prior call of the API corresponds to a query and a network-based response related to a point associated with a set of geographic coordinates, and adding the geographic information includes associating the network-based response with a larger geographic region including the point. The larger geographic region is an S2 cell.

Another example of these techniques is a computing device comprising processing hardware and configured to implement the method above.

Still another example embodiment of these techniques is a non-transitory computer-readable medium storing thereon instructions that implement an API for use by an enterprise client configured to receive service requests from user device devices. When invoked by the enterprise client and executed by processing hardware, the API is configured to: in a first instance, transmit the query to a geographic service via a communication network and generate a network-based response to the query using geographic information received from the geographic service in response to the query; and in a second instance, generate a storage-based response to the query using geographic information available in a storage implemented in a memory controlled by the enterprise client. The API is further configured to provide, in the first and the second instances, the respective generated response to the enterprise client.

DETAILED DESCRIPTION

Generally speaking, the techniques of this disclosure provide high reliability to an enterprise geographic API configured to service a request for geographic information from an enterprise client, which in turn uses the obtained geographic information to service requests from user devices. The enterprise client can provide to its users such services (e.g., location-based games) and can use the enterprise geographic API to obtain navigation routes, maps, business data for points of interest, and other types of geographic information relevant to the service of the enterprise client. The instructions that implement the enterprise geographic API can reside in a memory of a network server controlled by the enterprise client.

When invoked by the enterprise client, the enterprise geographic API transmits a request for the geographic information to a geographic service via a communication network. The enterprise geographic API (or another suitable software component) creates and manages a storage residing within the memory of the network server and containing geographic information. When the enterprise geographic API fails to receive a response to the transmitted request within a certain predetermined amount of time, the enterprise geographic API generates an at least approximate response based on the geographic information stored in the cache. However, if the response arrives from the geographic service within the predetermined amount of time, the enterprise geographic API generates a response to the query using the geographic information received from the geographic service.

Further, in some implementations, the enterprise geographic API implements local navigation, local search, and/or other functions that operate on the geographic information in the storage. These functions can correspond to a subset of the functionality supported by the geographic service. Still further, the enterprise geographic API in some implementations determines when the response received from the geographic service differs from the response generated using the geographic information in the cache by more than a certain amount and generates an appropriate notification, so as to provide quality monitoring.

These techniques are discussed in more detail below with reference to FIGS. 1-4.

Figure 1:
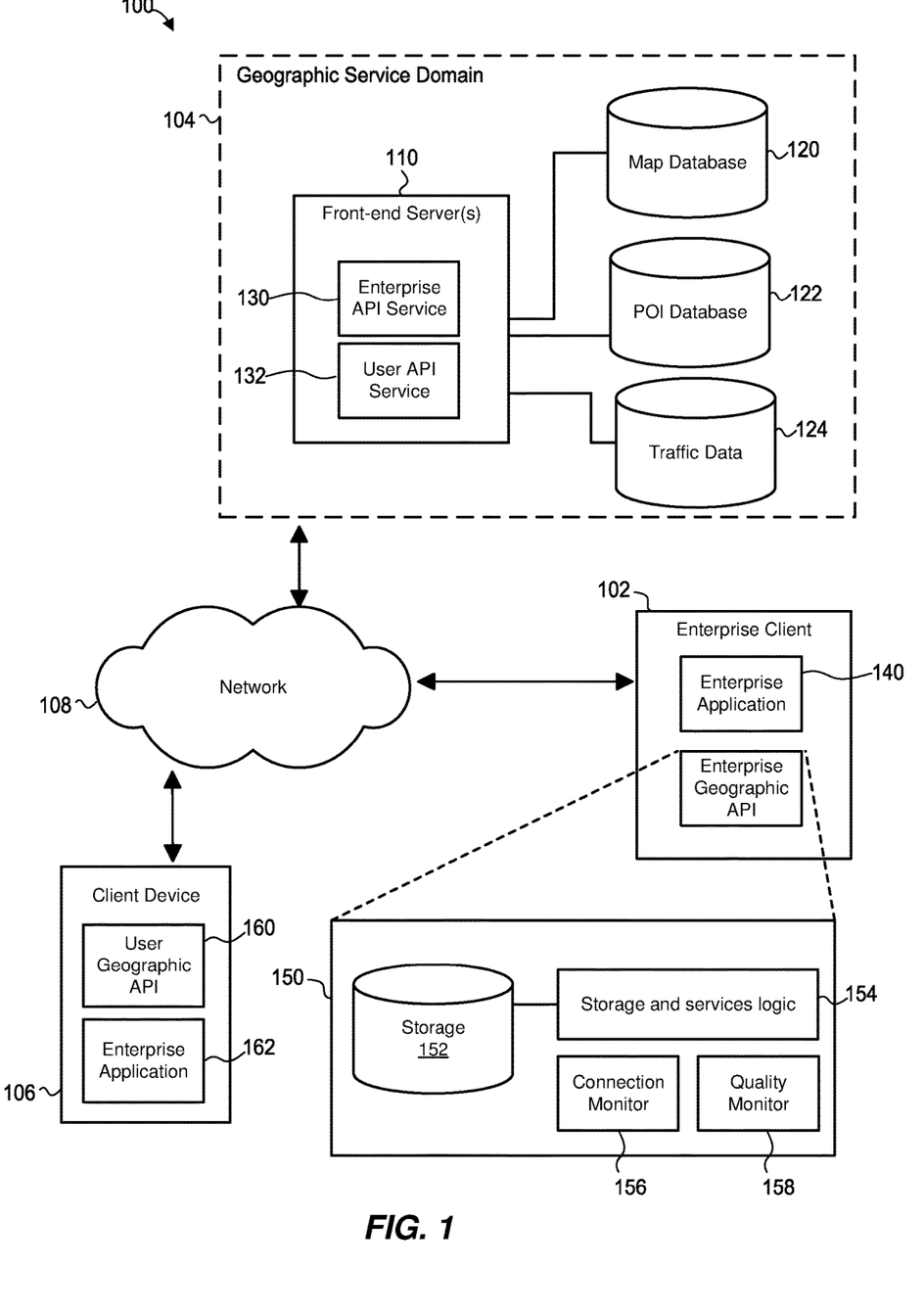
FIG. 1 is a block diagram of an example communication system in which an enterprise client can invoke the enterprise geographic API of this disclosure.

An example communication system 100 includes an enterprise client 102 that provides an enterprise service such as location-based games, taxi or rideshare services, delivery services, courier services, etc. The enterprise client 102 can receive requests for the enterprise from user (or "client") devices such as a client device 106. FIG. 1 illustrates only one such device to reduce clutter, but in general the communication system 100 can include any suitable number of client devices. The client device 106 can be, for example, a personal computer, a portable device such as a tablet computer or smartphone, wearable computing device, a special-purpose car navigator, a device embedded in a head unit of a vehicle, etc. The enterprise client 102 and the client device 106 can access one or more network servers operating in the domain of a geographic service 104, via a communication network 108 which can be a wide area network such as the Internet.

The domain of the geographic service 104 can include any suitable number of front-end servers, back-end servers, storage devices, etc. A front-end server 110 for example is coupled to a map database 120, a point-of-interest (POI) database 122, and a traffic database 124, etc. In operation, the front-end server 110 processes queries from the client enterprise client 102 and the client device 106, generates responses by executing various routing functions, search functions, etc. using the data in the databases 120, 122, and 124 for example. The generated responses can include map data for displaying digital maps of geographic areas, POI data for various locations, navigation data for navigating between geographic locations, etc.

The map database 120 can store map data specifying shapes and various properties of geographic features such as roads, buildings, lakes, rivers, parks, etc. The map data can conform to any suitable format such as vector graphics, rasterized images, text for labels, etc. and organized according to any suitable principle (e.g., square map tiles covering the same amount of area at a certain zoom level). The map data also can include street-level imagery and photographs collected from various vantage points. The POI database 122 can store information for specific locations identified by spatial coordinates and/or street addresses, for example. As a more particular example, the POI database 122 can store information about brick-and-mortar businesses located at the respective locations within the geographic area: hours of operation, description of products and services, user reviews, etc. The traffic database 124 can store current traffic conditions, accident reports, road closure data, etc. for various roads described by the map in the database 120.

In various implementations, the domain of the geographic service 104 can include fewer databases or, conversely, can include additional databases storing other types of geographic information. The one or more network servers operating in the domain of the geographic service 104 also can communicate with other services such as providers of real-time weather information, providers of information related to transportation (e.g., scheduling and routing information for trains, buses, ferries), etc.

To service requests from the enterprise client 102, the front-end server 110 can implement an enterprise API service 130. When an enterprise application 140 executing on one or more servers associated with the enterprise client 102 invokes an enterprise geographic API 150 to request certain geographic information, the set of instructions that implement the enterprise geographic API 150 can generate and transmit to the domain of the geographic service 104 a query which the enterprise API service 130 can process. Further, to service requests from the client device 106, the front-end server 110 can implement a user API service 132. When the client device 106 invokes a user geographic API 160 to request certain geographic information, the set of instructions that implement the user geographic API 160 can generate and transmit to the domain of the geographic service 104 a query which the user API service 132 can process.

Depending on the implementation, the services 130 and 132 can share none, some, or all of the geographic functionality. For example, each of the services 130 and 132 can generate a navigation route in a similar manner in response to a query specifying a source location and a destination. On the other hand, the service 130 can support certain functions not available to client devices via the user geographic API 160, such as determining an average travel time between two neighborhoods.

The front-end server 110, the client device 106, and the one or more network servers associated with the enterprise client 102 can include processing hardware such as one or more processors and a non-transitory memory (e.g., a hard disk, a flash drive to implement persistent and/or non-persistent storage components) storing data and/or instructions executable on the processing hardware (none shown to avoid clutter). The client device 106 also can include a user interface with any suitable combination of input devices such as a touchscreen, a keyboard, a microphone, etc. and output devices such as screens, speakers, etc.

With continued reference to FIG. 1, the enterprise geographic API 150 can implement a storage 152, a storage and services logic 154, a connection monitor 156, and a quality monitor 158.

The storage 152 can be disposed in the memory of the one or more network servers associated with the enterprise client 102. Thus, the enterprise client 102 in some cases has control over the memory in which the storage 152 is implemented. Moreover, the enterprise client 102 in these cases can access the storage 152 in a highly efficient and reliable manner via a local network or, in the event the storage 152 is implemented in the same device as the instructions of the enterprise geographic API 150, via a local bus. In other cases, the storage 152 can be implemented in a network server controlled by a third party, such as a cloud-based storage service. The third party operates separately and independently of the enterprise client 102 and the geographic service 104. According to this approach, the enterprise geographic API 150 still needs to access the storage 152 via the communication network 108 or another network. However, because the storage 152 operates independently of the geographic service 104, the probability of the geographic service 104 and the third party supporting the storage 152 become unavailable at the same time is relatively low. As such, geographic data can be provided to the enterprise client 102 in a reliable manner.

Moreover, it is also possible to allocate the storage 152 in a domain controlled by the provider of the geographic service 104, but preferably on one or more network servers operating sufficiently independently of the front-end server 110. In this manner, temporary unavailability of the front-end server 110 does not necessarily prevent the enterprise geographic API 150 from accessing the storage 152, unless the unavailability is due to the entire domain of the provider of the geographic service 104 being unreachable. Again, due to this geographic data can be provided to the enterprise client 102 in a reliable manner.

In any case, the storage 152 can store certain geographic information which in some cases is a subset of the information available in the databases 120, 122, 124, etc. For example, the storage 152 can store map data corresponding to only those geographic features that are likely to be important to the enterprise client 102, and omit the remaining features. As a more particular example, the storage 152 can store road information for a certain geographic area, so as to support navigation functionality, and not store information regarding museums, parks, and other POIs in some or all categories.

In some implementations, the storage 152 stores some of the response to previous queries submitted via the enterprise geographic API 150. The storage and services logic 154 can generalize these responses so that, for example, when the enterprise client 102 invokes the enterprise geographic API 150 to submit multiple queries for navigation directions from a certain neighborhood to a certain destination or area (e.g., from the Mission District of San Francisco, CA to the airport), the storage and services logic 154 can add to the storage a navigation route from the approximate center of the Mission District to the airport, and/or average travel time between the Mission District at the airport. As a more particular example, the storage and services logic 154 can store updated information for travel between the source and the destination after every X number of minutes (e.g., X=10, 20, 30, 60). In this manner, when the enterprise geographic API 152 cannot retrieve a navigation route for traveling from a particular location within the Mission District to the airport due to network failure or for some other reason, the storage and services logic 154 can query the storage 152 and determine expected travel time using the results of similar queries generated only within the past X minutes. As a result, the accuracy of the retrieved navigation route, and therefore the accuracy of other information that may be based thereon (e.g. the expected travel time, travel cost etc.), is improved as the enterprise geographic API 152 maintains up-to-date data.

As another example, the storage and services logic 154 can translate responses to previous queries from particular geographic coordinates (e.g., latitude and longitude) to S2 cells, or square regions of a certain fixed size. Thus, for example, the storage and services logic 154 can translate a geographic query (e.g., "find nearby coffee shops") related to coordinates ($Lat_1$, $Long_1$) to a cell $S_1$, a similar geographic query related to coordinates ($Lat_2$, $Long_2$) to the same cell $S_1$, and another similar geographic query related to coordinates ($Lat_3$, $Long_3$) to cell $S_2$.

As yet another example, the storage and services logic 154 can add to the storage 152 pre-computed route segments for traveling between centroids of cells $S_1$ and $S_2$, cells $S_1$ and $S_3$, cells $S_2$ and $S_3$, etc. The storage and services logic 154 can periodically compute these segments by querying the geographic service 104, which determines route segments between centroids of S2 cells in view of the current traffic conditions, weather conditions, etc. When the enterprise geographic API 150 cannot reach the geographic service 104 to service a request for navigation directions from a location in cell $S_x$ to a location in cell $S_y$, the storage and service logic 154 can access the storage 152, retrieve the relevant pre-computer route segments, and assemble a navigation route using segments between respective centroids of cells $S_x$ and $S_{x+1}$, cells $S_{x+1}$ and $S_{x+2}$, . . . $S_{x+N}$ and $S_y$.

The storage and services logic 154 also can support other geographic functions of the geographic service 104, in a complete or simplified ("lightweight") form. For example, the storage and services logic 154 can index certain geographic data (e.g., responses to frequent past geographic queries, such as the business hours of the Art Institute in Chicago, IL) to provide partial local search functionality.

Still referring to FIG. 1, the connection monitor 156 can determine whether the storage and services logic 154 should rely on the storage 152 when servicing a call to the enterprise geographic API 150. To this end, the connection monitor 156 can activate a timer after the storage and services logic 154 transmits a query to the geographic service 104 via the network 108 and determine whether a response arrives before the timer expires. Additionally or alternatively, the connection monitor 156 can determine average response time to queries to identify trends related to delays or disruptions of service.

The connection monitor 156 in some implementations is configured to provide periodic indications on the basis of which the geographic service 104 can determine that the network connection between the enterprise client 102 and the geographic service 104 is healthy. The periodic indication can include latency statistics for the enterprise client 102 or, in some implementations, convey information other than the identity of the enterprise client 102. Additionally or alternatively, the geographic service 104 can periodically ping the enterprise client 102 so that, when the enterprise client 102 fails to respond within a certain period of time, the geographic service 104 can identify a disruption of the network connection.

In some implementations, the quality monitor 158 can determine whether results to geographic queries received from the geographic service 104 differ from results the enterprise geographic API 150 generates in response to the same or similar geographic queries using the storage 152. For example, the enterprise client 102 can invoke the enterprise geographic API 150 to obtain a time estimate for driving from a certain location in San Francisco, CA to Mountain View, CA The front-end server 110 operating in the domain of the geographic service 104 can process the query and respond to the enterprise client 102 with an estimate of 55 minutes. The enterprise geographic API 150 can also generate a time estimate for the trip using geographic information available in the storage 152. Depending on the implementation, this estimate can be based on a certain number of similar queries the enterprise geographic API 150 processed within the past X minutes, or on similar queries the enterprise geographic API 150 typically processes at the same of time, for similar weather conditions, etc. In response to obtaining an estimate of 75 minutes, the enterprise geographic API 150 can determine that the network-based response and the storage-based responses differ by more than a certain threshold amount (e.g., 15%), and accordingly update latency statistics. The enterprise geographic API 150 in some implementations provides such statistics to the geographic service 104 at certain intervals (e.g., once an hour, once a day). The enterprise geographic API 150 also can provide an appropriate alert message to the geographic service 104, the enterprise client 102, or both.

In an example implementation, the enterprise client 102 provides a taxi service to users operating client devices similar to the client device 106. These devices can execute an enterprise application 162 via which users can submit service requests to the enterprise client 102. A request for example can specify the current location of the user, the destination of the user, and a query for available nearby cars and a cost estimate for travelling from the current location to the destination. As a part of processing this request, the enterprise client 102 can invoke the enterprise geographic API 150 to obtain a time estimate for travelling from the current location of the client 106 to the destination (so that the enterprise client 102 can determine the cost estimate based on the time estimate). In some cases, the enterprise geographic API 150 successfully queries the geographic service 104. In other cases, the enterprise geographic API 150 is unable to receive the response to the query within a certain predetermined period of time and generates the estimate using geographic information in the storage 152. In any case, the enterprise geographic API 150 provides the cost estimate to the client device 106 within a certain amount of time, so that the client device 106 does not experience an interruption in service regardless of whether the enterprise geographic API 150 can reach the geographic service 104. Further, the client device 106 can access the geographic service 104 via the user geographic API 160 to display a digital map at the current location or the destination, for example. The client device 106 can utilize the user geographic API 160 independently of the enterprise application 162.

Figure 2A:
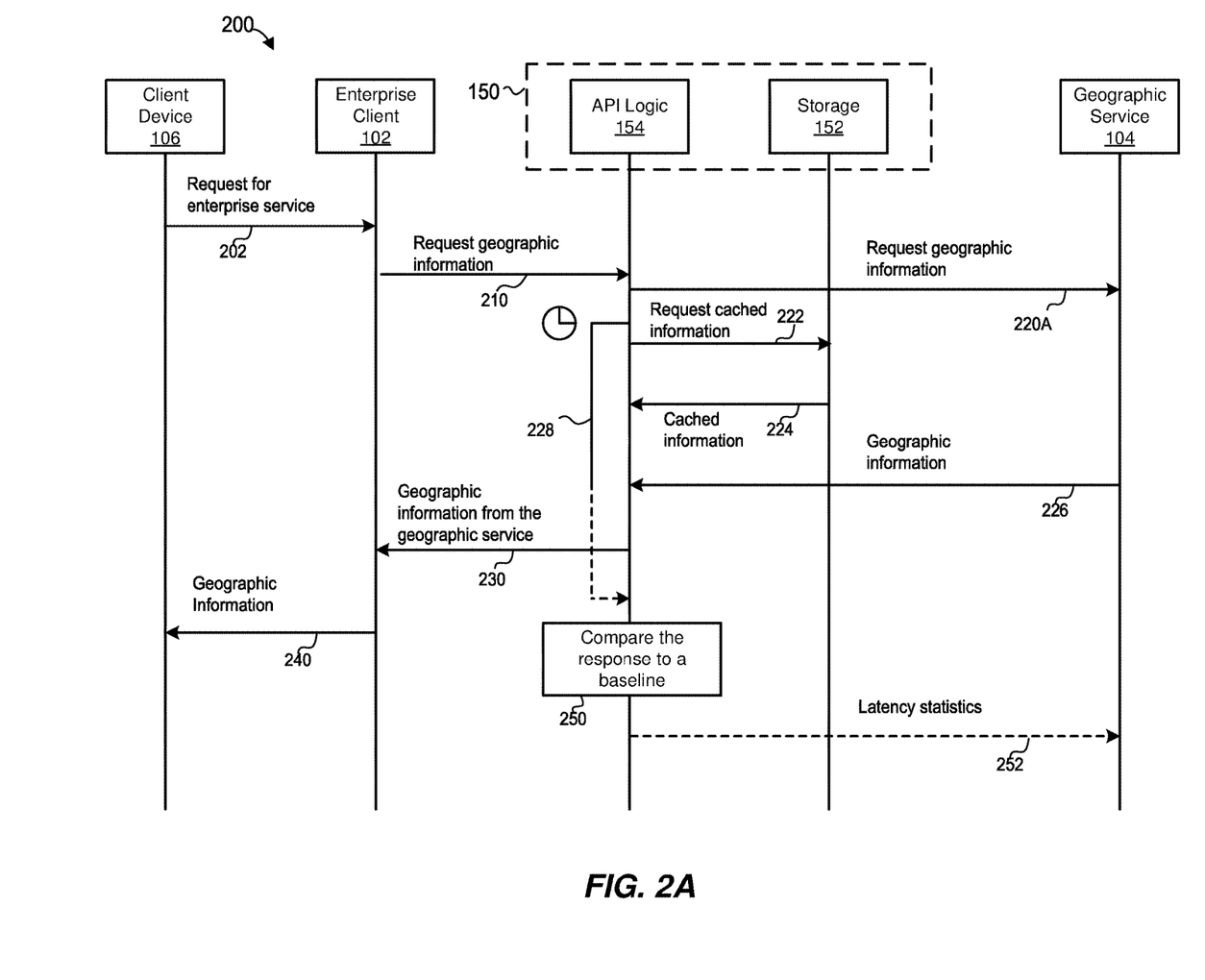
FIG. 2A is a messaging diagram of an example scenario in which the enterprise geographic API of this disclosure receives geographic information from a geographic service via a communication network, in response to a query.
Figure 2B:
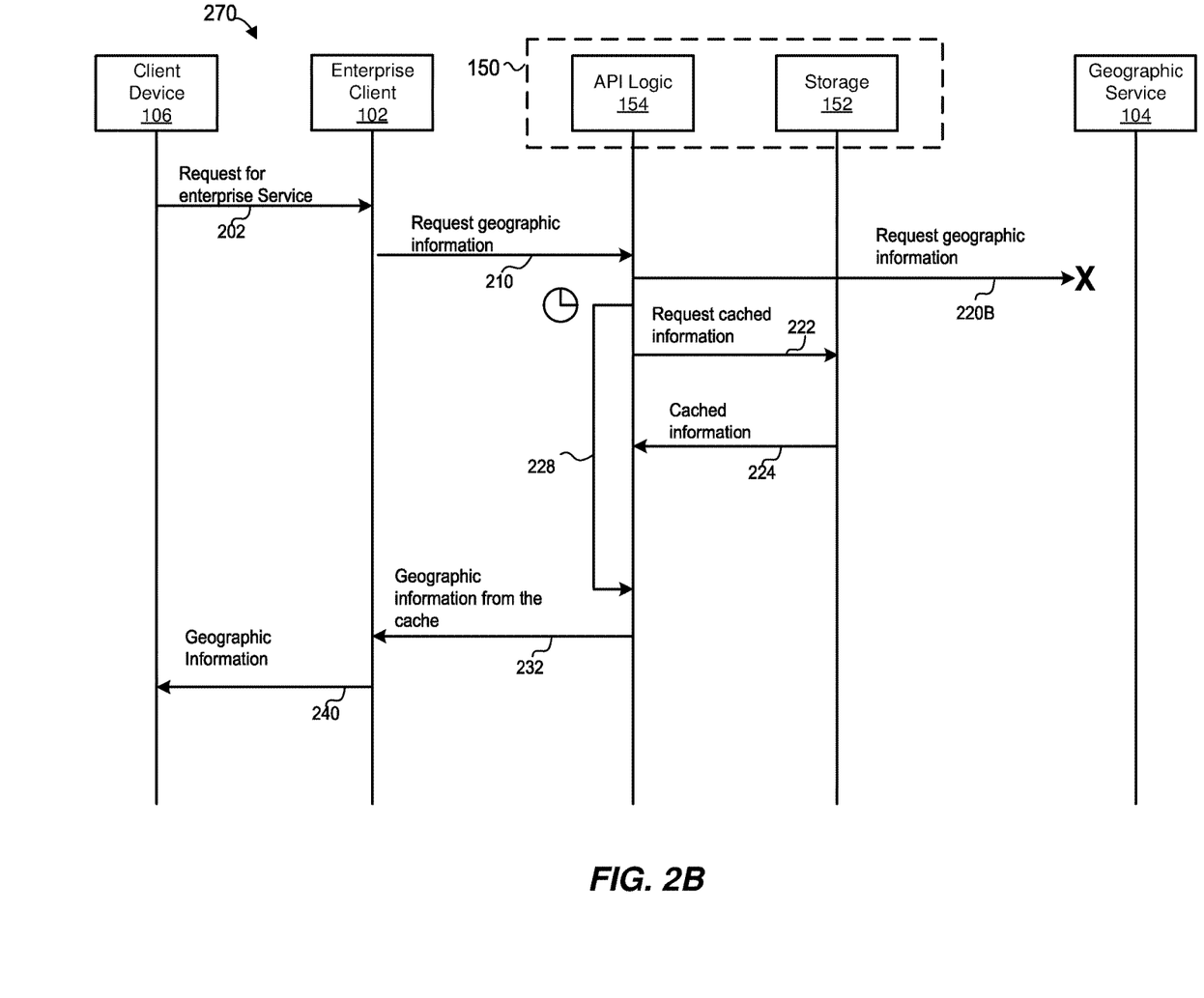
FIG. 2B is a messaging diagram of an example scenario in which the enterprise geographic API of this disclosure obtain geographic information from a storage that implements a cache, in response to a query.

Example scenarios in which the enterprise geographic API 150 can service a request for geographic information are considered with reference to FIGS. 2A and 2B.

At the beginning of scenario 200, the client device 106 submits 202 a request for service provided by the enterprise client 102. The enterprise client 102 determines that certain geographic information is required to service the request from the client device 106 and accordingly requests 210 geographic information via a call to the enterprise geographic API 150.

The API logic 154 then requests 220A geographic information from the geographic service 104. The API logic 154 starts 228 a timer to limit the period of time during which the enterprise geographic API 150 awaits a response from the geographic service 104 to a certain predetermined amount. Further, in this example implementation, the API logic 154 requests 222 cached information from the storage 152. In another implementation, the API logic 154 requests 222 cached information after the enterprise geographic API 150 receives a response to the query from the geographic service 104. In still other implementations, the API logic 154 requests 222 cached information only if the enterprise geographic API 150 does not receive a response to the query from the geographic service 104 within a certain period of time, as limited by the timer. In any case, the storage 152 provides 224 cached information to the API logic 154.

In the scenario 200, the geographic service 104 responds 226 to the query from the enterprise geographic API 150 before the timer expires. The geographic service 104 provides the requested geographic information, and the API logic 154 stops the timer. The API logic 154 then formats and provides 230 a response to the enterprise client 102. In some cases, the enterprise client 102 provides 240 this geographic information, or a message generated based on this geographic information, to the client device 106.

In some cases, the API logic 154 causes the quality monitor 158 (omitted from FIG. 2A for simplicity) to compare 250 the results received during events 224 and 226. When the results differ by more than a threshold amount, the API logic 154 can update latency statistics for subsequent reporting 252 to the geographic service 104. In some implementations, the API logic 154 also provides an alert message to the enterprise client 102.

Scenario 270 of FIG. 2B similarly begins with events 202 and 204. Also similar to the scenario of FIG. 2A, the API logic 154 requests 222 cached information from the storage 152, and the storage 152 provides 224 cached information to the API logic 154. Further, the API logic 154 starts 228 a timer to limit the amount of time during which the enterprise geographic API 150 awaits a response from the geographic service 104.

However, in this scenario the API logic 154 requests 220B geographic information from the geographic service 104 unsuccessfully. For example, the request the API logic 154 transmits 220B may not reach the front-end server 110 due to network connectivity issues, or the front-end server 110 may be going through a reboot procedure. In any case, the enterprise geographic API 150 does not receive a response from the geographic service 104 during the time period controlled by the timer the API logic 154 started 228 in response to transmitting 220B the request. Upon expiration of the timer, the API logic 154 determines that it should return 232 geographic information retrieved from the storage 152 to the enterprise client 102. Similar to the scenario of FIG. 2A, the enterprise client 102 in some cases can provide 240 this geographic information, or a message generated based on this geographic information, to the client device 106.

Referring to FIGS. 2A and 2B, the enterprise geographic API 150 can provide to the enterprise client 102 an indication of whether the response corresponds to a network-based response from the geographic service 104 or a storage-based response generated using geographic information in the storage 152. In some implementations, the indication can be explicit, such as a flag returned in response to a call to the enterprise geographic API 150 along with the corresponding geographic indication, with one value indicating a network-based response and another value indicating a storage-based response. In other implementations, the indication of the more typical and expected network-based response is implicit, and the indication that the response is storage-based is explicit.

Figure 3:
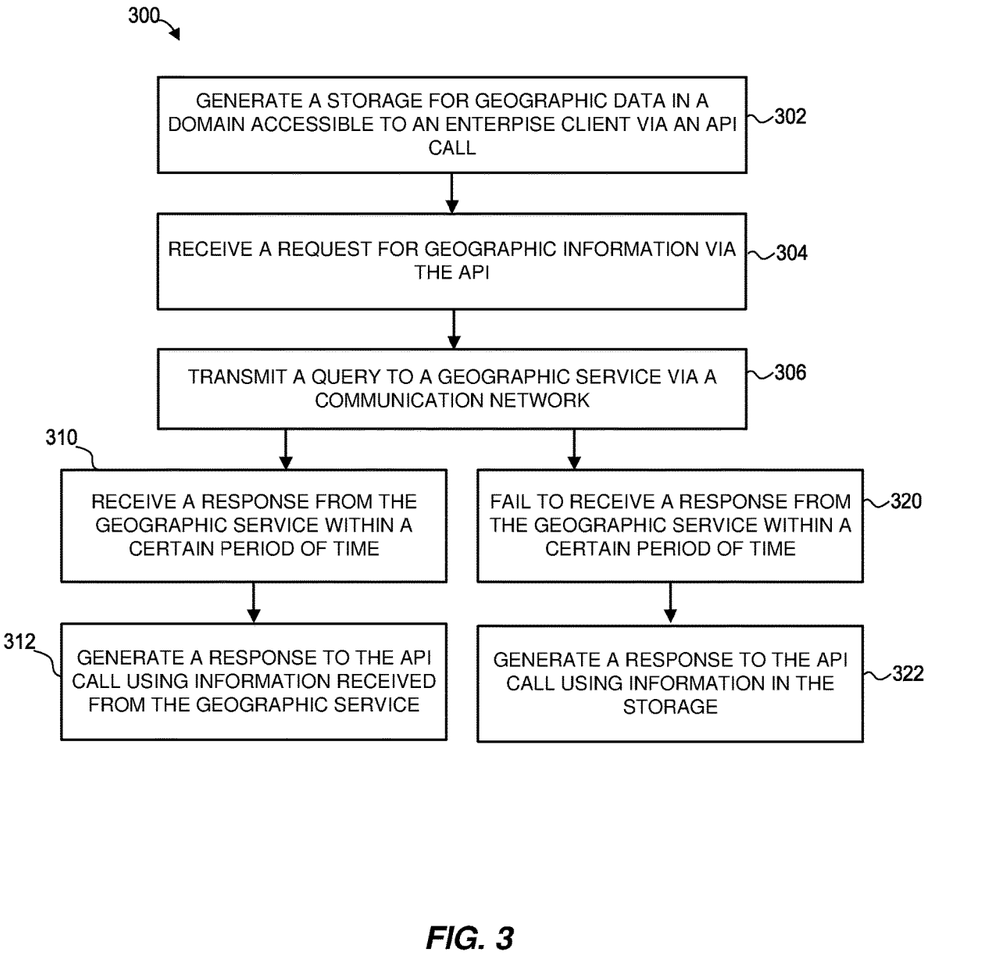
FIG. 3 is a flow diagram of an example method the enterprise geographic API of this disclosure can implement to service a call from an enterprise client, in two separate instances.
Figure 4:
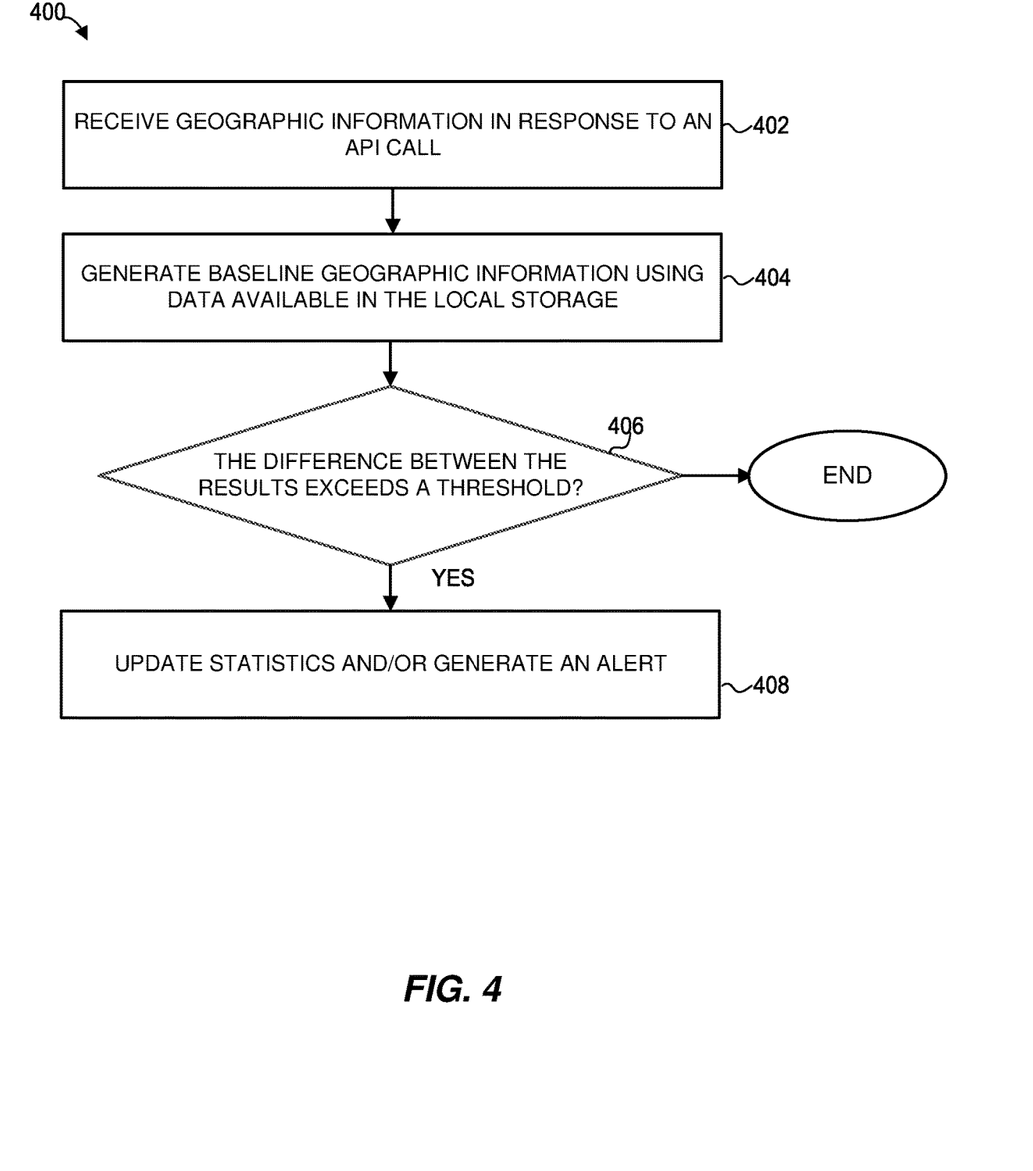
FIG. 4 is a flow diagram of an example method for quality monitoring that can be implemented in the enterprise geographic API of this disclosure.

For further clarity, FIGS. 3 and 4 illustrate example methods 300 and 400 which the enterprise geographic API 150 can implement. Each of the methods 300 and 400 can be implemented as a set of instructions stored on a non-transitory computer-readable medium and executed by processing hardware such as one or more processors.

Referring first to FIG. 3, the method 300 begins at block 302, where the enterprise geographic API 150 generates a storage for geographic data in a domain accessible to the enterprise client 102 via a call to the enterprise geographic API 150 (e.g., the storage 152 of FIGS. 1-2B). In some implementations, a software entity other than the enterprise geographic API 150 allocates the storage. For example, the enterprise client 102 can invoke a separate cache creation API specifically configured to create a storage for an enterprise client. The cache creation API in some implementations can allow the enterprise client 102 to control the size of the storage, the type of content to be cached, the type of functionality to be available, etc.

At block 304, the enterprise geographic API 150 is invoked with a request for geographic information (see event 210 of FIGS. 2A and 2B). In various scenarios, the request can specify geographic coordinates of an area for which the enterprise client 102 requests a digital map; a starting location and a destination for traveling between which the enterprise client 102 requests a time estimate, a distance estimate, or a complete set of directions; geographic coordinates or another reference to a point or an area along with a query to be executed in connection with the point or the area (e.g., "gas stations," "food"); etc.

Next, at block 306, the enterprise geographic API 150 formats and transmits to the geographic service 104 a query based on the information received at block 304 (see events 220A and 220B of FIGS. 2A and 2B, respectively). As discussed above, the enterprise geographic API 150 also can start a timer at approximately the same time as transmitting the query, so as to limit the period of time during which the enterprise geographic API 150 awaits a response (see event 228 in FIGS. 2A and 2B). Because the instructions that implement the enterprise geographic API 150 execute on the processing hardware of the enterprise client 102, the enterprise geographic API 150 transmits the query via the communication network 108 or another suitable communication network.

Optionally, the enterprise geographic API 150 can query the storage 152 to request cached geographic information (see events 222 of FIGS. 2A and 2B) at approximately the same time as transmitting the query to the geographic service at block 306. In the example implementation of FIG. 3, however, the enterprise geographic API 150 requests cached geographic information only after failing to receive a response from the geographic service, at block 322.

With continued reference to FIG. 3, the enterprise geographic API 150 in the first instance receives a response from the geographic service at block 310, prior to the expiration of the timer (see event 226 in FIG. 2A). The enterprise geographic API 150 then generates a response to the API call at block 312. To this end, the enterprise geographic API 150 uses the geographic information received from the geographic service.

In the second instance, however, the enterprise geographic API 150 fails to receive a response from the geographic service within the allotted period controlled by the timer. In particular, the enterprise geographic API 150 can detect timer expiration at block 320 (see event 228 in FIG. 2B). The flow then proceeds to block 322, where the enterprise geographic API 150 generates a response to the API call using the geographic information retrieved from the storage (see event 232 in FIG. 2B).

Now referring to FIG. 4, the method 400 for quality monitoring begins at block 402, where the enterprise geographic API 150 receives geographic information from the geographic service 104 (see event 226 in FIG. 2A). The enterprise geographic API 150 also generates, at block 404, "baseline" geographic information using the storage (see event 224 in FIG. 2A). The enterprise geographic API 150 can generate this baseline geographic information prior to receiving a response from the geographic service, prior to receiving the response from the geographic service, or at approximately the same time as response from the geographic service.

Next, at block 406, the enterprise geographic API 150 determines whether the difference between the geographic information obtained at blocks 402 and 404 exceeds a certain threshold amount (see event 250 of FIG. 2A). To this end, the enterprise geographic API 150 can for example measure the extent to which the estimates of travel times or travel distances differ (e.g., 22 minutes versus 30 minutes). In response to determining that the difference exceeds the threshold amount, the enterprise geographic API 150 updates latency statistics and/or generates an alert for the client enterprise client 102 at block 408 (see event 252 of FIG. 2A). Otherwise, the method 400 completes after block 406.

Additional Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components, modules, or mechanisms. Modules may constitute either software modules (e.g., code stored on a machine-readable medium) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. As used herein "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The methods 300 and 400 may include one or more function blocks, modules, individual functions or routines in the form of tangible computer-executable instructions that are stored in a non-transitory computer-readable storage medium and executed using a processor of a computing device (e.g., a server device, a personal computer, a smart phone, a tablet computer, a smart watch, a mobile computing device, or other client computing device, as described herein). The methods 300 and 400 may be included as part of any backend server (e.g., an augmented reality server, a ridesharing server, a map data server, a navigation server, or any other type of server computing device, as described herein), client computing device modules of the example environment, for example, or as part of a module that is external to such an environment. Though the figures may be described with reference to the other figures for ease of explanation, the methods 300 and 400 can be utilized with other objects and user interfaces. Furthermore, although the explanation above describes steps of the methods 800 and 900 being performed by specific devices (such as an augmented reality server 110, a driver client device 10, or a rider client device 28), this is done for illustration purposes only. The blocks of the methods 300 and 400 may be performed by one or more devices or other parts of the environment.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations or devices.

The one or more processors may also operate to support performance of the relevant operations in a "cloud computing" environment or as an SaaS. For example, as indicated above, at least some of the operations may be performed by a group of computers (as examples of machines including processors), these operations being accessible via a network (e.g., the Internet) and via one or more appropriate interfaces (e.g., APIs).

What is claimed is:

1. A method for providing availability of geographic data to enterprise clients, the method comprising:
generating, by processing hardware, a storage storing geographic information available to an enterprise client via an application programming interface (API) call, the enterprise client configured to (i) receive service requests from a plurality of user devices and (ii) invoke the API to provide, in response to the service requests, information related to geography; and
when the enterprise client makes a first call to invoke the API to submit a first query, and in response to determining that the geographic service is available:
transmitting the first query to a geographic service via a communication network and generating a network-based response to the first query using geographic information received from the geographic service, and when the enterprise client makes a second call to invoke the API to submit a second query, and in response to determining that the geographic service is unavailable: generating a storage-based response to the second query using the geographic information stored in the storage.

2. The method of claim 1, further comprising, transmitting, by the processing hardware, the second query to the geographic service, and generating the storage-based response upon determining that no response to the second query is received within a predetermined period of time that begins when the second query is transmitted to the geographic service.

3. The method of claim 1, further comprising:

generating the storage-based response to the second query using the geographic information stored in the storage; and in response to determining, by the processing hardware, that the network-based response and the storage-based response differ by more than a threshold amount, updating latency statistics periodically reported to the geographic service.

4. The method of claim 3, further comprising providing an alert to the enterprise client.

5. The method of claim 1, wherein the network-based response and the storage-based response include respective estimates of a time for traveling between a source and a destination.

6. The method of claim 1, further comprising:

providing, by the processing hardware, an indication that that the second query was serviced using the storage along with the storage-based response to the second query.

7. The method of claim 1, wherein generating the storage includes generating the storage on one or more network servers associated with the enterprise client.

8. The method of claim 1, wherein generating the storage includes generating the storage on one or more network servers operated independently of the enterprise client and of the geographic service.

9. The method of claim 1, further comprising:

providing, in the storage, a set of instructions configured to implement a function for generating navigation directions using the geographic information stored in the storage.

10. The method of claim 9, wherein the function for generating the navigation directions generates a navigation route using pre-computed route segments.

11. The method of claim 1, further comprising:

providing, in the storage, a set of instructions configured to implement a function for executing a local search for a specified geographic region.

12. The method of claim 1, further comprising:

adding geographic information to the storage based on a prior call of the API by the enterprise client.

13. The method of claim 12, wherein:

the prior call of the API corresponds to a third query and a network-based response related to a point associated with a set of geographic coordinates, adding the geographic information includes associating the network-based response with a larger geographic region including the point.

14. The method of claim 13, wherein the larger geographic region is an S2 cell.

15. A computing device comprising processing hardware and configured to:

generate a storage storing geographic information available to an enterprise client via an application programming interface (API) call, the enterprise client configured to (i) receive service requests from a plurality of user devices and (ii) invoke the API to provide, in response to the service requests, information related to geography; and when the enterprise client makes a first call to invoke the API to submit a first query, and in response to determining that the geographic service is available:

transmitting the first query to a geographic service via a communication network and generating a network-based response to the first query using geographic information received from the geographic service, and when the enterprise client makes a second call to invoke the API to submit a second query, and in response to determining that the geographic service is unavailable: generating a storage-based response to the second query using the geographic information stored in the storage.

16. The computing device of claim 15, further configured to:

transmit the second query to the geographic service, and generate the storage-based response upon determining that no response to the second query is received within a predetermined period of time that begins when the second query is transmitted to the geographic service.

17. The computing device of claim 15, further configured to:

generate the storage-based response to the second query using the geographic information stored in the storage; and in response to determining that the network-based response and the storage-based response differ by more than a threshold amount, update latency statistics periodically reported to the geographic service.

18. The computing device of claim 17, further configured to provide an alert to the enterprise client.

* * * * *